Sept. 7, 1965  E. I. RYSHKEWITCH  3,205,080
BERYLLIA-SILICON CARBIDE CERAMIC BODIES
Filed Oct. 19, 1964
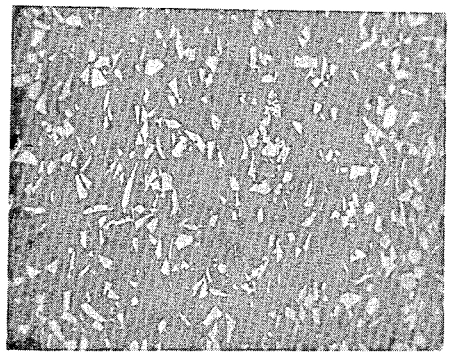
INVENTOR
EUGENE I. RYSHKEWITCH
BY *Greene and Durr*
ATTORNEY

United States Patent Office 3,205,080
Patented Sept. 7, 1965

3,205,080
BERYLLIA-SILICON CARBIDE CERAMIC BODIES
Eugene I. Ryshkewitch, Ridgewood, N.J., assignor to National Beryllia Corp., Haskell, N.J., a corporation of New Jersey
Filed Oct. 19, 1964, Ser. No. 404,861
2 Claims. (Cl. 106—44)

This application is a continuation-in-part of my U.S. application Ser. No. 114,252, filed June 1, 1961, and now abandoned.

This invention relates to the manufacture of sintered, ceramic, refractory bodies and to the bodies so produced.

Among the objects of this invention is to provide refractory bodies of improved heat shock resistance and additional improved mechanical properties especially at high temperatures.

Among other objects of the invention is to provide refractory compositions which are less likely to deteriorate in properties during the forming and sintering operations.

This invention is based on the discovery that beryllium oxide and silicon carbide are chemically compatible to produce sintered bodies having properties which in many respects are superior to the properties of either component employed by itself.

Thus, the objects of the invention are attained by mixing silicon carbide and beryllia powders in the proportions of about 85:15 to 15:85 by volume (preferably between 20:80 and 80:20 by volume) and sintering or hot pressing the mixture. The mixed powders may be hot pressed in a graphite mold at a temperature of 1800°–2000° C. and a pressure of about 2500–3000 p.s.i. (pounds per square inch). Or, the powder mixture may be pressed, slip cast, extruded or otherwise formed to shape and thereafter sintered at 1800°–2000°. The body is sintered in a non-oxidizing atmosphere.

The figure of the drawing is a reproduction of a photomicrograph at 450×, of a product obtained by the process of Example 1 below.

In the drawing, the BeO is gray and the silicon carbide is white.

The following examples further illustrate the operation of the invention.

*Example 1*

25% by weight of SiC and 75% by weight of BeO are wet ground together in a ball mill until the mix is −325 mesh in particle size, the individual particles being less than about 44 microns in size. The particles are dried and hot pressed in a graphite mold at about 1900° C. and 2600 p.s.i.

The microstructure of the product is disclosed in the figure of the drawing. It can be seen from this figure that there are no interfacial flaws nor a third phase between the BeO and SiC particles and this is excellent evidence that the components are chemically compatible. As a comparison, when a highly refractory oxide such as alumina is combined with a malleable metallic component such as molybdenum to form a compound ceramic body, cracks at the boundary between the oxide and the metal particles of the body appear. As apparent from the drawing, no such cracks appear in the compound body of the invention. Since no traces of a chemical interaction are present, it is stated that these components SiC and BeO are "chemically compatible." This result is not predictable especially since the BeO is a brittle, high refractory oxide with a comparatively high expansion coefficient ($9-10 \times 10^{-6}/°C.$) whereas SiC is a still more brittle high refractory carbide with a relatively low thermal expansion ($3-4 \times 10^{-6}/°C.$), both being chemically active.

Other advantages resulting from the chemical compatibility of these two materials is that the composite body with respect to its mechanical properties appears to act as a unit and takes on coefficients and values which are intermediate between the extremes of the ranges of values for BeO and SiC alone. Thus, the heat conductivity of pure dense beryllia is 2.4 watts/cm. at room temperature, but only 0.3 watt/cm. at 1000° C. and the thermal conductivity of silicon carbide is only 1 watt/cm. at room temperature and is about 0.4–0.5 watt/cm. at 1000° C. The thermal conductivity of the composite product of the invention is intermediate between 2.4 and 1 watt/cm. at room temperature and between 0.3 and 0.5 watt/cm. at 1000° C. This condition improves the heat shock resistance of the compound BeO/SiC body.

Since, as stated above, the expansion rate of silicon carbide is only about ⅓ of that of sintered beryllia, the compound BeO/SiC body has a smaller expansion than a pure BeO body again improving the thermal shock resistivity.

Actual tests on heat shock resistance have shown the superior resistance to thermal shock of the bodies of the present invention.

The compound BeO/SiC bodies have better mechanical resistivity and strength than the pure BeO bodies which may be attributed to the rigid, diamond-like internal lattice structure of the silicon carbide component. For example, the flexural strength of SiC decreases only by 25% when the temperature is increased from room temperature to 1000° C. whereas the strength decrease of pure beryllia in the same range amounts to about 80%.

Pure sintered SiC bodies are difficult (if not entirely impossible) to produce, and are susceptible to oxidation at elevated temperatures. The beryllia component of the present compound body is substantially completely resistant to oxidation and imparts a good measure of this property to the composite mixture.

*Example 2*

25% by volume of SiC and 75% by volume of BeO are wet ground in a ball mill to provide a mix of −325 mesh size. The powder mix is dried, a temporary binder such as polyvinyl alcohol and water are added and the mass is molded at a pressure of 0.8 to 1.5 t.s.i. (tons per square inch). The molded product is then sintered at 1800°–2000° C. in a reducing or neutral atmosphere. The product has substantially the same properties as the product of Example 1.

*Examples 3–5*

SiC and BeO in the proportions set forth in the table were ground together until of a particle size less than 40–44 microns (−325 mesh), then wet with aqueous polyvinyl chloride, molded under 0.8 to 1.5 t.s.i. and sintered as in Example 2.

| Example | Wt. SiC | Wt. BeO | Vol. SiC/BeO | Watt/cm. °C., Thermal conductivity | Microstructure |
|---|---|---|---|---|---|
| 3 | 80 | 20 | 79/21 | 1.15W | Similar to drawing. |
| 4 | 50 | 50 | 49/51 | 1.58W | Do. |
| 5 | 25 | 80 | 19.5/80.5 | 1.82W | Do. |

The features and principles underlying the invention described above in connection with specific exemplifications will suggest to those skilled in the art many other modifications thereof. It is accordingly desired that the appended claims shall not be limited to any specific feature of details thereof.

I claim:
1. Shaped and sintered refractory bodies showing substantially no interfacial flaws between the sintered particles consisting essentially of silicon carbide and beryllia in the proportions by volume of SiC/BeO of between 15:85 to 85:15.

2. The process of making sintered refractory bodies showing substantially no interfacial flaws between the sintered particles comprising providing a mixture consisting essentially of silicon carbide and beryllia in the proportions by volume of SiC/BeO of between 15:85 and 85:15, grinding the mixture to a particle size of —325 mesh, and molding and sintering the powder at about 1800–2000° C. under nonoxidizing conditions.

References Cited by the Examiner

UNITED STATES PATENTS

| | | | |
|---|---|---|---|
| 2,040,236 | 5/36 | Benner et al. | 106—44 |
| 2,445,296 | 7/48 | Wejnarth | 106—44 |
| 2,672,426 | 3/54 | Grubel et al. | 117—169 |
| 2,937,213 | 5/60 | Hutchings et al. | 252—432 X |

TOBIAS E. LEVOW, *Primary Examiner.*